United States Patent
Fisher et al.

(10) Patent No.: US 10,054,163 B2
(45) Date of Patent: Aug. 21, 2018

(54) BEARING CAGES FOR ROLLER BEARING ASSEMBLIES

(71) Applicant: General Electric Company, Schenectady, NY (US)

(72) Inventors: Kenneth Lee Fisher, Schenectady, NY (US); Bugra Han Ertas, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 18 days.

(21) Appl. No.: 15/351,885

(22) Filed: Nov. 15, 2016

(65) Prior Publication Data

US 2018/0135697 A1    May 17, 2018

(51) Int. Cl.
*F16C 33/46*    (2006.01)

(52) U.S. Cl.
CPC ...... *F16C 33/4682* (2013.01); *F16C 33/4641* (2013.01); *F16C 2360/23* (2013.01)

(58) Field of Classification Search
CPC ........................... F16C 33/467; F16C 33/4676
USPC .................................................. 384/470, 580
See application file for complete search history.

(56) References Cited

U.S. PATENT DOCUMENTS

| | | | |
|---|---|---|---|
| 2,883,245 A | * | 4/1959 | Anderson |
| 3,199,935 A | * | 8/1965 | Pitner |
| 3,350,149 A | * | 10/1967 | Oechsler |
| 4,222,620 A | * | 9/1980 | Mirring |
| 4,403,813 A | | 9/1983 | Schaefer |
| 5,295,749 A | * | 3/1994 | Takahashi et al. |
| 6,068,408 A | | 5/2000 | Mutoh et al. |
| 6,367,983 B1 | | 4/2002 | Muntnich et al. |
| 6,443,625 B1 | | 9/2002 | Nogi |

(Continued)

FOREIGN PATENT DOCUMENTS

| | | |
|---|---|---|
| JP | 2007182935 A | 7/2007 |
| JP | 5521761 B2 | 6/2014 |

OTHER PUBLICATIONS

Bowen et al., "The Hollow Roller Bearing", Journal of Lubrication Technology, vol. 102, Issue: 2, pp. 222-227, Apr. 1, 1980.

(Continued)

*Primary Examiner* — Thomas R Hannon
(74) *Attorney, Agent, or Firm* — GE Global Patent Operation; Nitin Josh

(57) ABSTRACT

A bearing cage for a roller bearing assembly includes an annular body defining a circumferential centerline extending therethrough. The annular body includes an outer circumferential surface, an opposing inner circumferential surface, and a plurality of circumferentially spaced roller cavities defined therein. Each roller cavity of the plurality of roller cavities is configured to receive an associated roller element. Each roller cavity includes a first radial cross-wall defined within the annular body extending from the outer circumferential surface to the inner circumferential surface. Each roller cavity further includes an opposing second radial cross-wall defined within the annular body extending from the outer circumferential surface to the inner circumferential surface. At least a portion of the first radial cross-wall and at least a portion of the second radial cross-wall are complimentary to the associated roller element.

11 Claims, 4 Drawing Sheets

(56) References Cited

U.S. PATENT DOCUMENTS

| | | | |
|---|---|---|---|
| 7,594,761 B2 * | 9/2009 | Koyama et al. |
| 7,670,058 B2 * | 3/2010 | Schorr et al. |
| 8,591,121 B2 | 11/2013 | Suzuki et al. |
| 8,814,440 B2 | 8/2014 | Fukami |
| 8,905,646 B2 * | 12/2014 | Omoto et al. |
| 9,316,255 B2 | 4/2016 | Yasuda |

OTHER PUBLICATIONS

Fangbo Ma et al., "Simulation of hydrodynamic lubrication between cage pockets and rollers in cylindrical roller bearings", Journal of Mechanical Engineering Science, vol. 229, Issue: 14, pp. 2551-2560, Oct. 2015.

* cited by examiner

BEARING CAGES FOR ROLLER BEARING ASSEMBLIES

BACKGROUND

The field of the disclosure relates generally to rotary machines and, more specifically, to bearing cages for roller bearing assemblies.

At least some known turbomachines include one or more shafts which are rotatably supported by several known bearings, typically of a rolling-element type. These known bearings in the turbomachine are usually a combination of roller bearings and ball bearings, and are enclosed in sumps, which are pressurized and receive an oil flow for lubrication and cooling. The roller bearings support radial loads induced by the shaft and the ball bearings support radial and thrust loads induced by the shaft.

Some known roller bearing assemblies include an annular inner ring coupled to the shaft and an annular outer ring, with a plurality of rollers circumferentially spaced about a center axis therebetween. The roller bearing assembly further includes a bearing cage that is positioned between the inner and outer rings to receive the rollers. These roller bearing assemblies may also be used in a planetary bearing assembly. At least some planetary bearing assemblies include 3-6 roller bearing assemblies circumferentially spaced about a planetary center axis. Each roller bearing assembly is rotatable about its center axis, and the entire planetary bearing assembly is rotatable about its planetary center axis. With multiple axes of rotation, some known planetary bearing assemblies load and unload the rollers such that when the rollers are unloaded, centrifugal forces induce contact with the bearing cage. As such, the rollers increase contact with the bearing cage, thereby accelerating wear within the roller bearing assembly.

BRIEF DESCRIPTION

In one aspect, a bearing cage for a roller bearing assembly is provided. The bearing cage includes an annular body defining a circumferential centerline extending therethrough. The annular body includes an outer circumferential surface, an opposing inner circumferential surface, and a plurality of circumferentially spaced roller cavities defined therein. Each roller cavity of the plurality of roller cavities is configured to receive an associated roller element. Each roller cavity includes a first radial cross-wall defined within the annular body extending from the outer circumferential surface to the inner circumferential surface. Each roller cavity further includes an opposing second radial cross-wall defined within the annular body extending from the outer circumferential surface to the inner circumferential surface. At least a portion of the first radial cross-wall and at least a portion of the second radial cross-wall are complementary to the associated roller element.

In another aspect, a roller bearing assembly is provided. The roller bearing assembly includes an inner annular ring, an outer annular ring, a plurality of roller elements, and a bearing cage comprising an annular body defining a circumferential centerline extending therethrough. The annular body includes an outer circumferential surface, an opposing inner circumferential surface, and a plurality of circumferentially spaced roller cavities defined therein. Each roller cavity of the plurality of roller cavities is configured to receive an associated roller element of the plurality of roller elements. Each roller cavity includes a first radial cross-wall defined within the annular body extending from the outer circumferential surface to the inner circumferential surface. Each roller cavity further includes an opposing second radial cross-wall defined within the annular body extending from the outer circumferential surface to the inner circumferential surface. At least a portion of the first radial cross-wall and at least a portion of the second radial cross-wall are complementary to the associated roller element.

In still another aspect, a rotary machine is provided. The rotary machine includes at least one rotatable shaft, and at least one roller bearing assembly coupled to the at least one rotatable shaft. The at least one roller bearing assembly includes an inner annular ring, an outer annular ring, a plurality of roller elements, and a bearing cage comprising an annular body defining a circumferential centerline extending therethrough. The annular body includes an outer circumferential surface, an opposing inner circumferential surface, and a plurality of circumferentially spaced roller cavities defined therein. Each roller cavity of the plurality of roller cavities is configured to receive an associated roller element of the plurality of roller elements. Each roller cavity includes a first radial cross-wall defined within the annular body extending from the outer circumferential surface to the inner circumferential surface. Each roller cavity further includes an opposing second radial cross-wall defined within the annular body extending from the outer circumferential surface to the inner circumferential surface. At least a portion of the first radial cross-wall and at least a portion of the second radial cross-wall are complementary to the associated roller element.

DRAWINGS

These and other features, aspects, and advantages of the present disclosure will become better understood when the following detailed description is read with reference to the accompanying drawings in which like characters represent like parts throughout the drawings, wherein.

Figure 1:
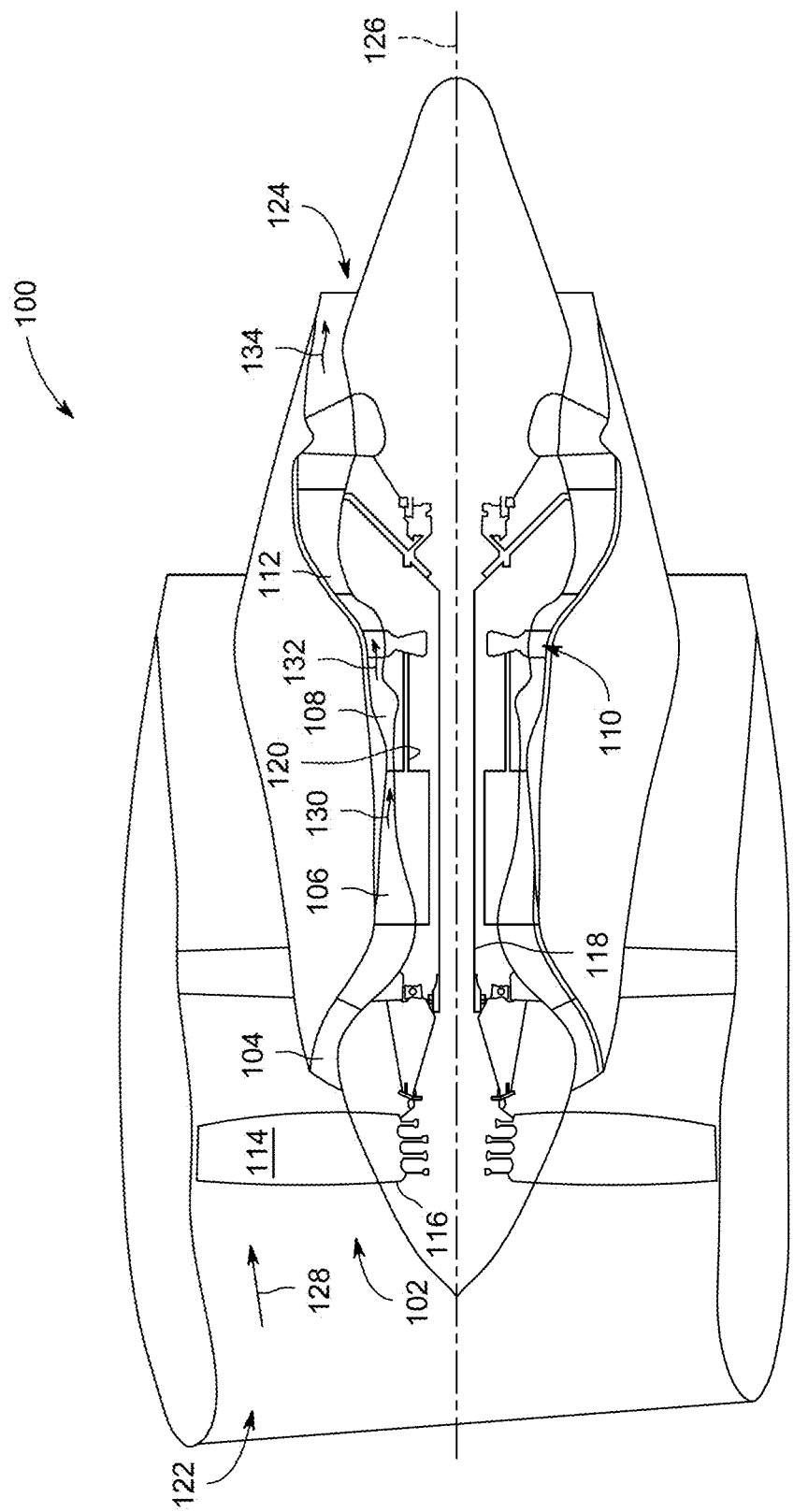
FIG. 1 is a schematic view of an exemplary rotor machine, i.e., a gas turbine engine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal axis of a gas turbine engine. Moreover, the terms "radial" and "radially" refer to directions and orientations extending substantially perpendicular to the longitudinal axis of the gas turbine engine. In addition, as used herein, the terms "circumferential" and "circumferentially" refer to directions and orientations extending arcuately about a longitudinal axis of the gas turbine engine.

Embodiments of the present disclosure relate to bearing assemblies that facilitate reducing wear of the components therein. Specifically, in the exemplary embodiments, a bearing cage includes a plurality of circumferentially spaced roller cavities defined therein that receive an associated roller element. Each roller cavity includes a first and a second cross-wall that substantially corresponds to the associated roller element forming a tight clearance fit and a journal bearing for the roller element. As such, a thin oil film space is defined between the bearing cage and the roller element. Oil is channeled through the oil film space to form an oil film that facilitates absorbing loads, thereby reducing wear of the roller elements and the bearing cage. In certain embodiments, the first and second cross-walls include an oblique portion that extends to a circumferential surface of the bearing cage. The oblique portion of the roller cavity facilitates the roller cavity receiving the associated roller element while maintaining the tight clearance fit and the thin oil film space to form the oil film therein. By forming an effective film space and providing the oil film therein, the embodiments of the bearing assemblies described herein reduce wear of the bearing cage and roller elements. Additionally, by reducing loads from the roller element on the bearing cage, overall bearing cage thickness may be reduced and/or the number of roller bearings within the bearing assembly may be increased, thereby increasing efficiency of the bearing assembly and a rotary machine.

FIG. 1 is a schematic view of a rotary machine 100, i.e., a turbomachine, and more specifically, a turbine engine. In the exemplary embodiment, turbine engine 100 is a gas turbine engine. Alternatively, turbine engine 100 is any other turbine engine and/or rotary machine, including, and without limitation, a steam turbine engine, an aircraft engine, a wind turbine, and a compressor. In the exemplary embodiment, gas turbine engine 100 includes a fan assembly 102, a low pressure or booster compressor 104, a high-pressure compressor 106, and a combustor 108. Fan assembly 102, booster compressor 104, high-pressure compressor 106, and combustor 108 are coupled in flow communication. Turbine engine 100 also includes a high-pressure turbine 110 coupled in flow communication with combustor 108 and a low-pressure turbine 112. Fan assembly 102 includes an array of fan blades 114 extending radially outward from a rotor disk 116. Low-pressure turbine 112 is coupled to fan assembly 102 and booster compressor 104 via a first drive shaft 118, and high-pressure turbine 110 is coupled to high-pressure compressor 106 via a second drive shaft 120. Turbine engine 100 has an intake 122 and an exhaust 124. Turbine engine 100 further includes a centerline 126 about which fan assembly 102, booster compressor 104, high-pressure compressor 106, and turbine assemblies 110 and 112 rotate.

In operation, intake 122 channels air 128 towards through fan assembly 102, as well as, booster compressor 104 and high-pressure compressor 106. Compressors 104 and 106 compresses inlet air 128 to higher pressures prior to discharging compressed air 130 towards combustor 108. Compressed air 130 is channeled to combustor 108 where it is mixed with fuel (not shown) and burned to generate high temperature combustion gases 132. Combustion gases 132 are channeled downstream towards high-pressure turbine 110 and low-pressure turbine 112, such that after impinging turbine blades (not shown) thermal energy is converted to mechanical rotational energy that is used to drive first drive shaft 118 and second drive shaft 120 respectively about centerline 126. Exhaust gases 134 then discharge through exhaust 124 to ambient atmosphere.

Figure 2:
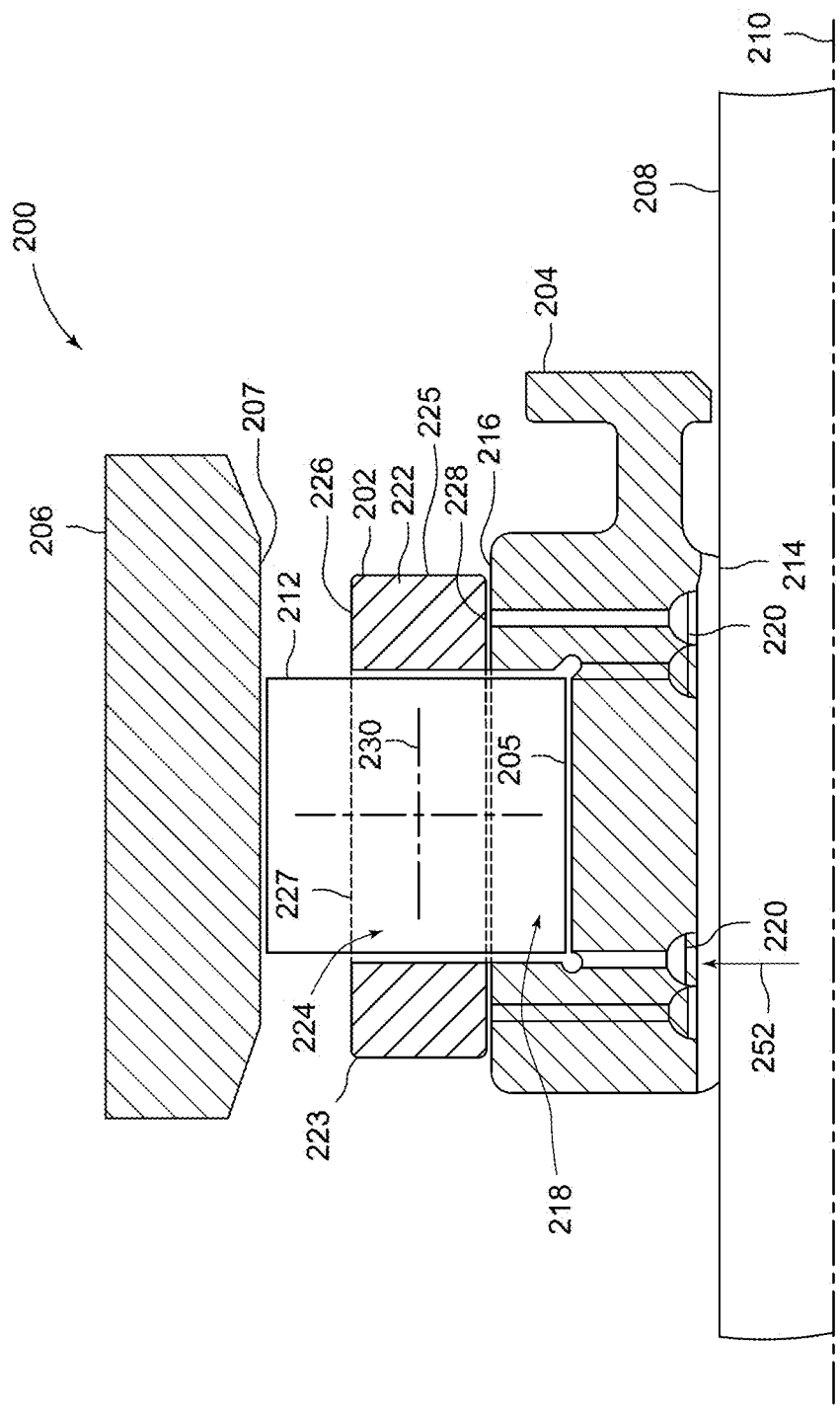
FIG. 2 is a cross-sectional view of an exemplary bearing assembly that may be used with the rotor machine shown in FIG. 1.
Figure 3:
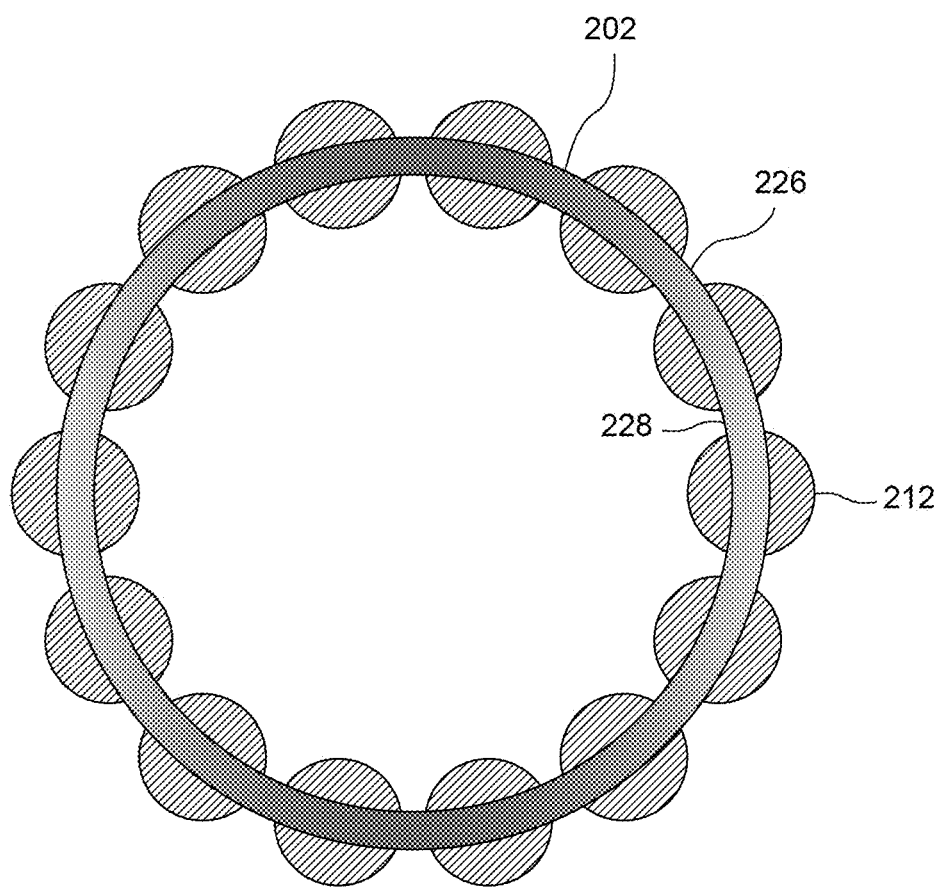
FIG. 3 is an end view of an exemplary bearing cage with rollers that may be used with the bearing assembly shown in FIG. 2.
Figure 4:
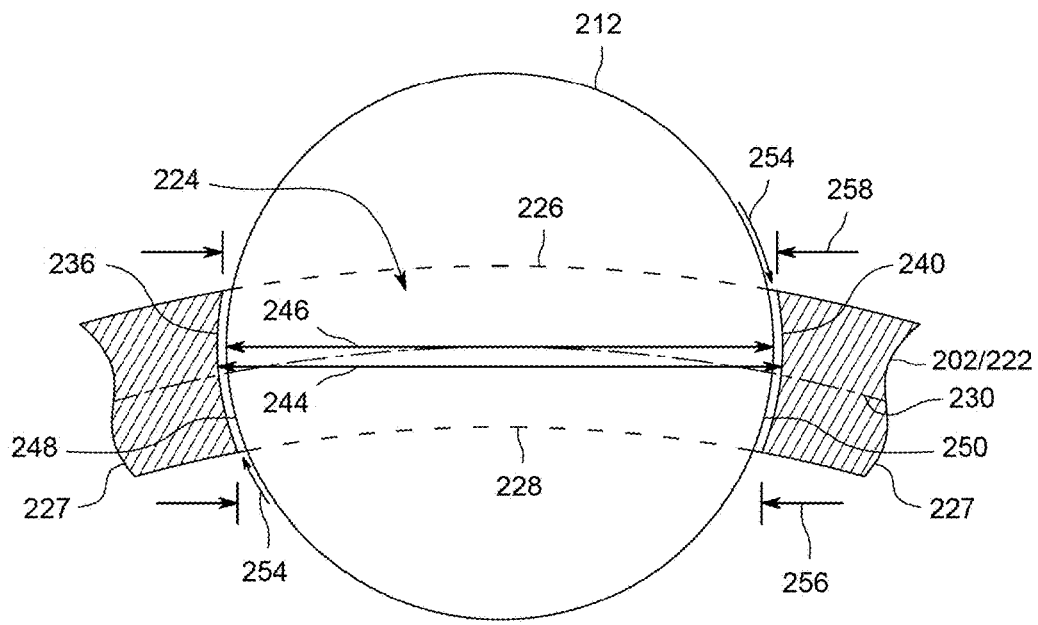
FIG. 4 is a circumferential cross-sectional view of an exemplary roller cavity that may be used with the bearing cage shown in FIG. 3.

FIG. 2 is a cross-sectional view of an exemplary bearing assembly 200 that may be used with rotor machine 100 (shown in FIG. 1). FIG. 3 is an end view of an exemplary bearing cage 202 with rollers 212 that may be used with bearing assembly 200 (shown in FIG. 2). FIG. 4 is a circumferential cross-sectional view of an exemplary roller cavity 224 that may be used with bearing cage 202 (shown in FIG. 3). Referring to FIGS. 2-4, in the exemplary embodiment, bearing assembly 200 includes bearing cage 202 disposed between an annular inner ring 204 including an inner race 205 and an annular outer ring 206 including an outer race 207. Inner ring 204 is mounted on a shaft 208 that is rotatable about a centerline 210, and outer ring 206 surrounds inner ring 204. Positioned between inner ring 204 and outer ring 206 and within races 205 and 207 is a plurality of circumferentially spaced cylindrical roller elements 212.

Inner ring 204 includes an inner radial surface 214 and an opposite outer radial surface 216. Outer radial surface 216 includes an outer radial cavity 218 defined therein and that facilitates receiving at least a portion of roller element 212. At least one radial opening 220 is defined through inner ring 204 from inner radial surface 214 to outer radial cavity 218 or outer radial surface 216. Radial opening 220 facilitates channeling a lubricant, such as oil, into outer radial cavity 218.

Bearing cage 202 includes an annular body 222 that is positioned between inner ring 204 and outer ring 206. Annular body 222 includes a first rail 223 and an opposite second rail 225 coupled together through a plurality of circumferentially spaced cross-rails 227 such that a plurality of roller cavities 224 are defined therebetween that facilitate receiving roller elements 212 and maintaining a separated position of each roller element 212. Annular body 222 also includes an outer circumferential surface 226 opposite outer ring 206 and an inner circumferential surface 228 opposite inner ring 204. A circumferential centerline 230 is defined on annular body 222. In some embodiments, the centerlines of roller elements 212 are positioned approximately centered along circumferential centerline 230 within roller cavity 224. In other embodiments, the centerlines of roller elements 212 are positioned above or below circumferential centerline 230 within roller cavity 224.

Roller cavity 224 includes a first radial cross-wall 236 defined in cross-rail 227 of annular body 222 that extends from outer circumferential surface 226 to inner circumferential surface 228. In the exemplary embodiment, first radial cross-wall 236 has a concave shape that is complementary to the shape of roller element 212. Additionally, roller cavity 224 includes a second radial cross-wall 240 defined, in the opposite cross-rail 227 of annular body 222 that extends from outer circumferential surface 226 to inner circumferential surface 228, Second radial cross-wall 240 has a concave shape that is complementary to the shape of roller element 212. In the exemplary embodiment, roller cavity 224 is defined with a diameter 244, Roller cavity diameter 244 defined by first and second radial cross-walls 236 and 240 is greater than a diameter 246 of roller element 212 such that a tight clearance fit is formed. For example, roller cavity diameter 244 is greater than roller element diameter 246 within a range between and inclusive of approximately one percent of roller element diameter 246 and approximately two percent of roller element diameter 246. As such, a first film space 248 is defined between roller element 212 and first radial cross-wall 236, and a second film space 250 is defined between roller element 212 and second radial cross-wall 240. Both first film space 248 and second film space 250 facilitate receiving oil and forming an oil film therein. In the exemplary embodiment, film spaces 248 and 250 have a substantially constant thickness between cross-walls 236 and 240 and roller element 212, respectively, between outer circumferential surface 226 and inner circumferential surface 228.

In operation, bearing assembly 200 facilitates supporting radial loads induced by shaft 208, and a lubricant, such as oil, is typically provided within bearing assembly 200 to reduce wear and reduce metal-to-metal contact of the components. For example, oil 252 is channeled through one or more radial openings 220 into inner ring outer radial cavity 218 to cool and lubricate roller element 212 therein. In a planetary bearing, with multiple axes of rotation, centrifugal forces increase contact between roller element 212 and bearing cage 202, and thus accelerate wear. To reduce wear thereof, roller cavity 224 is formed such that oil film spaces 248 and 250 are defined between bearing cage 202 and roller element 212. Film spaces 248 and 250 receive a flow of oil 254, from the movement of roller element 212, that facilitate forming a film of oil between bearing cage 202 and roller element 212 to absorb loads and reduce wear between bearing cage 202 and roller element 212. The concave shape of first and second radial cross-walls 236 and 240 form a journal bearing surface with roller element 212 that receives an oil film therein such that a journal bearing is formed to reduce the centrifugal forces on roller element 212 from acting on bearing cage 202. By absorbing at least part of the loads from roller element 212 with oil film, and reducing the centrifugal forces from roller element 212 with a tight fitting roller cavity 224, a thickness of annular body 222 may be reduced. Furthermore, with the thickness of annular body reduced a number of roller elements 212 within bearing assembly 200 may increase.

In the exemplary embodiment, roller element diameter 246 is larger than a length 256 of roller cavity 224 at inner circumferential surface 228, and roller element diameter 246 is larger than a length of 258 of roller cavity 224 at outer circumferential surface 226. As such, bearing cage 202 facilitates maintaining roller element 212 position within bearing assembly 200 in a tight clearance fit and forming oil film spaces 248 and 250 for reducing wear. However, roller element 212 is too large to fit into bearing cage 202. In one embodiment, bearing cage 202 is formed from a material that facilitates bearing cage 202 to flex and receive roller element 212, such that roller element 212 is insertable into roller cavity 224. In another embodiment, bearing cage 202 is a two piece assembly that includes, for example, a first member and a second member, such that bearing cage 202 is split into two members to receive roller element 212 before being removably coupled together. In alternative embodiments, bearing cage 202 is formed from any other material and/or system that enables bearing cage 202 to function as described herein.

Figure 5:
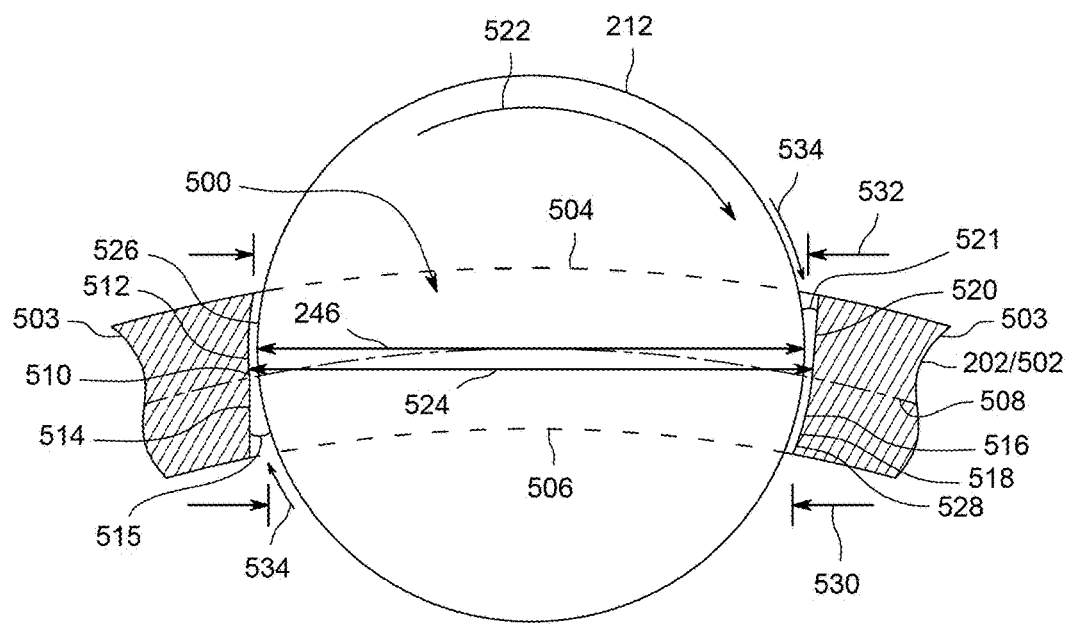
FIG. 5 is a circumferential cross-sectional view of another exemplary roller cavity that may be used with the bearing cage shown in FIG. 3.

FIG. 5 is a circumferential cross-sectional view of another exemplary roller cavity 500 that may be used with bearing cage 202 (shown in FIG. 2). Similar to the embodiment described above in reference to FIGS. 2-4, in the exemplary embodiment, bearing cage 202 includes an annular body 502 that includes a first rail and an opposite second rail (both not shown) coupled tighter through a plurality of circumferentially spaced cross-rails 503 such that a plurality of roller cavities 500 are defined therebetween that facilitate receiving roller elements 212 and maintaining a separated position of each roller elements 212 in a tight clearance fit. Annular body 502 further includes an outer circumferential surface 504 opposite outer ring 206 and an inner circumferential surface 506 opposite inner ring 204. A circumferential centerline 508 is defined on annular body 502. In some embodiments, roller elements 212 are positioned approximately centered along circumferential centerline 508 within roller cavity 500. In other embodiments, roller elements 212 are positioned above or below circumferential centerline 508 within roller cavity 500.

Roller cavity 500 includes a first radial cross-wall 510 defined in cross-rail 503 of annular body 502 that extends from outer circumferential surface 504 to inner circumferential surface 506. First radial cross-wall 510 includes a concave portion 512 that is complementary to the shape of roller element 212 and an oblique portion 514. In this exemplary embodiment, concave portion 512 extends between outer circumferential surface 504 and oblique portion 514, while oblique portion 514 extends between concave portion 512 and inner circumferential surface 506 such that a gap 515 is defined between first radial cross-wall 510 and roller element 212. Additionally, roller cavity 500 includes a second radial cross-wall 516 defined in the opposite cross-rail 503 of annular body 502 that extends from outer circumferential surface 504 to inner circumferential surface 506. Second radial cross-wall 516 includes a concave portion 518 that is complementary to the shape of roller element 212 and an oblique portion 520. In this exemplary embodiment, concave portion 518 extends between inner circumferential surface 506 and oblique portion 520, while oblique portion 520 extends between concave portion 512 and outer circumferential surface 504 such that a gap 521 is defined between second radial cross-wall 516 and roller element 212. As such, oblique portions 514 and 520 are adjacent to circumferential surface 504 or 506 that is in a direction of rotation 522 of roller element 212. In this exemplary embodiment, gap 515 and gap 521 are substantially similar, however, in alternative embodiments gap 515 and 521 are different. Additionally, in alternative embodiments, only one of first radial cross-wall 510 or second radial cross-wall 516 include oblique portion 514 or 520 respectively. In other alternative embodiments, oblique portions 514 and 520 are adjacent to circumferential surface 504 or 506 that is opposite rotation direction 522 of roller element 212.

In this exemplary embodiment, roller cavity 500 from first and second cross-walls 510 and 516 is defined with a diameter 524. Roller cavity diameter 524 is greater than roller element diameter 246. For example, roller cavity diameter 524 is greater than roller element diameter 246 within a range between and inclusive of approximately one percent of roller element diameter 246 and approximately two percent of roller element diameter 246. As such, a first film space 526 is defined between roller element 212 and first radial cross-wall 510, and a second film space 528 is defined between roller element 212 and second radial cross-wall 516. Both first film space 526 and second film space 528 facilitate receiving oil and forming an oil film therein.

Additionally, a length 530 of roller cavity 500 at inner circumferential surface 506 and/or a length 532 of roller cavity 500 at outer circumferential surface 504 are slightly greater than roller element diameter 246. As such, lengths 530 and/or 532 facilitate receiving roller element 212 within roller cavity 500 in a tight clearance fit without bearing cage 202 and annular body 502 being flexible.

In operation, film spaces 526 and 528 receive a flow of oil 534 from the movement of roller element 212 that facilitates forming a film of oil between bearing cage 202 and roller element 212 to reduce wear between bearing cage 202 and roller element 212. Concave portions 512 and 518 of first and second radial cross-walls 510 and 516 form a journal bearing surface with roller element 212 that receives an oil film therein such that a journal bearing is formed to absorb loads and reduce the centrifugal forces on roller element 212 from acting on bearing cage 202. By absorbing at least part of the loads from roller element 212 with oil film, and reducing the centrifugal forces from roller element 212 with a tight fitting roller cavity 500, a thickness of annular body 502 may be reduced, and a number of roller elements 212 within bearing assembly 200 may increase. Additionally, oblique portions 514 and 520 define gaps 515 and 521 respectively that facilitate trapping an increased flow of oil 534 from the rotation of roller element 212 to form the oil film.

The above-described embodiments provide efficient bearing assemblies for reducing wear of the components therein. Specifically, in the exemplary embodiments, a bearing cage includes a plurality of circumferentially spaced roller cavities defined therein that receive an associated roller element. Each roller cavity includes a first and a second cross-wall that substantially corresponds to the associated roller element forming a tight clearance fit and a journal bearing for the roller element. As such, a thin oil film space is defined between the bearing cage and the roller element. Oil is channeled through the oil film space to form an oil film that facilitates absorbing loads, thereby reducing wear of the roller elements and the bearing cage. In certain embodiments, the first and second cross-walls include an oblique portion that extends to a circumferential surface of the bearing cage. The oblique portion of the roller cavity facilitates the roller cavity receiving the associated roller element while maintaining the tight clearance fit and the thin oil film space to form the oil film therein. By forming an effective film space and providing the oil film therein, the embodiments of the bearing assemblies described herein reduce wear of the bearing cage and roller elements. Additionally, by reducing loads from the roller element on the bearing cage, overall bearing cage thickness may be reduced and/or the number of roller bearings within the bearing assembly may be increased, thereby increasing efficiency of the bearing assembly and a rotary machine.

An exemplary technical effect of the systems and methods described herein includes at least one of: (a) forming an effective bearing area with an oil film to reduce wear within a bearing assembly; (b) forming a roller cavity that facilitates receiving a roller element with a tight clearance fit (c) reducing wear between a bearing cage and a roller element in the bearing assembly; (d) reducing bearing cage thicknesses; (e) increasing rolling element numbers within the bearing cage; and (f) increasing bearing assembly efficiency.

Exemplary embodiments of systems and methods for reducing wear in a bearing assembly are described above in detail. The methods and systems are not limited to the specific embodiments described herein, but rather, components of systems and/or steps of the methods may be utilized independently and separately from other components and/or steps described herein. For example, the method may also be used in combination with other turbine components, and are not limited to practice only with the roller bearing assemblies as described herein. Rather, the exemplary embodiment can be implemented and utilized in connection with many other gas turbine engine applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A bearing cage for a roller bearing assembly, said bearing cage comprising:
an annular body defining a circumferential centerline, extending therethrough, said annular body comprising:
an outer circumferential surface;
an opposing inner circumferential surface;
plurality of circumferentially spaced roller cavities defined therein, each roller cavity of said plurality of roller cavities configured to receive an associated roller element, said each roller cavity comprising:
a first radial cross-wall defined within said annular body extending from said outer circumferential surface to said inner circumferential surface;
an opposing second radial cross-wall defined within said annular body extending from said outer circumferential surface to said inner circumferential surface, wherein at least a portion of said first radial cross-wall and at least a portion of said second radial cross-wall are complementary to the associated roller element;
wherein said, first radial cross-wall comprises a concave portion that is complementary tip the associated roller element and an oblique portion that, extends to at least one of said outer circumferential surface and said inner circumferential surface, said second radial cross-wall comprises a concave portion that is complementary to the associated roller element and an oblique portion that extends to at least one of said outer circumferential surface and said inner circumferential surface; and wherein said first concave portion adjacent to one of said outer circumferential surface and said inner circumferential surface, said second concave portion adjacent to the other of said outer circumferential surface and said inner circumferential surface.

2. The bearing cage in accordance with claim 1, wherein at least a portion of said first radial cross-wall and said second radial cross-wall are configured to form a journal bearing for the associated roller element.

3. The bearing cage in accordance with claim 1, wherein said first radial cross-wall comprises a concave portion that is complementary to the associated roller element and an oblique portion that extends to at least one of said outer circumferential surface and said inner circumferential surface.

4. The bearing cage in accordance with claim 1, wherein said annular body is formed from a material configured to flex and receive the associated roller element.

5. A roller bearing assembly comprising:
an inner annular ring;
an outer annular ring;
a plurality of roller elements;
a bearing cage comprising an annular body defining a circumferential centerline extending therethrough, said annular body comprising:
an outer circumferential surface;
an opposing inner circumferential surface;
a plurality of circumferentially spaced roller cavities defined therein, each roller cavity of said plurality of roller cavities configured to receive an associated roller element of said plurality of roller elements, said each roller cavity comprising:
a first radial cross-wall defined within said annular body extending from said outer circumferential surface to said inner circumferential surface;
an opposing second radial cross-wall defined within said annular body extending from said outer circumferential surface to said inner circumferential surface, wherein at least a portion of said first radial cross-wall and at least a portion of said second radial cross-wall are complementary to said associated roller element;

wherein said first radial cross-wall comprises a concave portion that is complementary to said associated roller element and an oblique portion that extends to at least one of said outer circumferential surface and said inner circumferential surface, said second radial cross-wall comprises a concave portion that is complementary to said associated roller element and an oblique portion that extends to at least one of said outer circumferential surface and said inner circumferential surface; and wherein said first concave portion adjacent to one of said outer circumferential surface and said inner circumferential surface, said second concave portion adjacent to the other of said outer circumferential surface and said inner circumferential surface.

6. The roller bearing assembly in accordance with claim 5, wherein at least a portion of said first radial cross-wall and said second radial cross-wall are configured to form a journal bearing for the associated roller element.

7. The roller bearing assembly in accordance with claim 5, wherein said first radial cross-wall comprises a concave portion that is complementary to said associated roller element and an oblique portion that extends to at least one of said outer circumferential surface and said inner circumferential surface.

8. The roller bearing assembly in accordance with claim 5, wherein said annular body is formed from a material configured to flex and receive said associated roller element.

9. A rotary machine comprising:
at least one rotatable shaft; and
at least one roller bearing assembly coupled to said at least one rotatable shaft, said at least one roller bearing assembly comprising:
an inner annular ring;
an outer annular ring;
a plurality of roller elements;
a bearing cage comprising an annular body defining a circumferential centerline extending therethrough, said annular body comprising:
an outer circumferential surface;
an opposing inner circumferential surface;
a plurality of circumferentially spaced roller cavities defined therein, each roller cavity of said plurality of roller cavities configured to receive an associated roller element of said plurality of roller elements, said each roller cavity comprising:
a first radial cross-wall defined within said annular body extending from said outer circumferential surface to said inner circumferential surface;
an opposing second radial cross-wall defined within said annular body extending from said outer circumferential surface to said inner circumferential surface, wherein at least a portion of said first radial cross-wall and at least a portion of said second radial cross-wall are complementary to said associated roller element;

wherein said first radial cross-wall comprises a concave portion that is complementary to said associated roller element and an oblique portion that extends to at least one of said outer circumferential surface and said inner circumferential surface, said second radial cross-wall comprises a concave portion that is complementary to said associated roller element and an oblique portion that extends to at least one of said outer circumferential surface and said inner circumferential surface; and wherein said first concave portion adjacent to one of said outer circumferential surface and said inner circumferential surface, said second concave portion adjacent to the other of said outer circumferential surface and said inner circumferential surface.

10. The rotary machine in accordance with claim 9, wherein at least a portion of said first radial cross-wall and said second radial cross-wall are configured to form a journal bearing for the associated roller element.

11. The rotary machine in accordance with claim 9, wherein said first radial cross-wall comprises a concave portion that is complementary to said associated roller element and an oblique portion that extends to at least one of said outer circumferential surface and said inner circumferential surface.

* * * * *